(12) United States Patent
Gopalakrishnan

(10) Patent No.: US 8,755,310 B1
(45) Date of Patent: Jun. 17, 2014

(54) CONFERENCING SYSTEM

(76) Inventor: Kumar C. Gopalakrishnan, Mountain View, CA (US)

(*) Notice: Subject to any disclaimer, the term of this patent is extended or adjusted under 35 U.S.C. 154(b) by 102 days.

(21) Appl. No.: 13/455,856

(22) Filed: Apr. 25, 2012

Related U.S. Application Data

(60) Provisional application No. 61/481,246, filed on May 2, 2011.

(51) Int. Cl.
*H04Q 11/00* (2006.01)

(52) U.S. Cl.
USPC ........ 370/260; 370/352; 370/356; 348/14.08; 348/14.09; 348/14.11

(58) Field of Classification Search
CPC ......... H04N 7/15; H04N 7/152; H04N 7/147; H04M 3/56; H04L 29/06027
USPC ............ 370/360, 352, 356; 348/14.08, 14.11, 348/14.09
See application file for complete search history.

(56) References Cited

U.S. PATENT DOCUMENTS

| | | | |
|---|---|---|---|
| 2004/0008635 A1* | 1/2004 | Nelson et al. ................. | 370/260 |
| 2004/0263610 A1* | 12/2004 | Whynot et al. ............ | 348/14.08 |
| 2005/0021620 A1* | 1/2005 | Simon et al. .................. | 709/204 |
| 2006/0055771 A1* | 3/2006 | Kies .......................... | 348/14.03 |
| 2006/0066717 A1* | 3/2006 | Miceli ......................... | 348/14.09 |
| 2007/0200923 A1* | 8/2007 | Eleftheriadis et al. ..... | 348/14.08 |
| 2008/0158339 A1* | 7/2008 | Civanlar et al. ............ | 348/14.09 |
| 2008/0165708 A1* | 7/2008 | Moore et al. .................. | 370/260 |
| 2009/0015660 A1* | 1/2009 | Vedantham et al. ........ | 348/14.09 |
| 2009/0295905 A1* | 12/2009 | Civanlar et al. ............ | 348/14.09 |
| 2010/0037151 A1* | 2/2010 | Ackerman et al. ............ | 715/753 |
| 2010/0149306 A1* | 6/2010 | Gopal et al. ................ | 348/14.09 |
| 2010/0315482 A1* | 12/2010 | Rosenfeld et al. ......... | 348/14.08 |
| 2011/0145881 A1* | 6/2011 | Hartman et al. ............... | 725/118 |
| 2011/0154417 A1* | 6/2011 | Civanlar et al. ............... | 725/105 |
| 2012/0163577 A1* | 6/2012 | Buford et al. ............ | 379/202.01 |
| 2013/0024518 A1* | 1/2013 | Alexandrov et al. ......... | 709/204 |
| 2013/0038675 A1* | 2/2013 | Malik ........................ | 348/14.08 |

* cited by examiner

*Primary Examiner* — Khaled Kassim

(57) ABSTRACT

A system creates and operates a conferencing session over communication networks in conjunction with other external processes. The system can include a conferencing server (e.g., including at least one processor, memory, a nonvolatile or magnetic memory), which interconnects client devices. These clients can include smartphones which can communicate through the server text, audio, or video information, and combinations of these. Connections can be through a date network such as the Internet.

12 Claims, No Drawings

CONFERENCING SYSTEM

CROSS-REFERENCE TO RELATED APPLICATIONS

This patent application claims the benefit of U.S. patent application 61/481,246, filed May 2, 2011, which is incorporated by reference.

BACKGROUND OF THE INVENTION

The present invention is related in general to teleconferencing systems. More specifically, the present invention relates to a system for creating and operating a conferencing session over communication networks in conjunction with other external processes.

Systems for teleconferencing are widely used for various communication purposes. The growing use of teleconferencing capable devices by users simultaneously while performing other tasks however presents new opportunities for developing conferencing mechanisms that are relevant to operation in conjunction with such external processes.

There is a need for improved teleconferencing systems.

BRIEF SUMMARY OF THE INVENTION

Other objects, features, and advantages of the present invention will become apparent upon consideration of the following detailed description and the accompanying drawings, in which like reference designations represent like features throughout the figures.

BRIEF DESCRIPTION OF THE DRAWINGS

None

DETAILED DESCRIPTION OF THE INVENTION

The detailed description set forth below in connection with any appended drawings is intended as a description of preferred embodiments of the invention, and is not intended to represent the only form in which the present invention may be constructed or utilized. The detailed description sets forth the construction and functions of the invention, as well as the sequence of steps for operating the invention in connection with the illustrated embodiments. It is to be understood, however, that the same or equivalent functions may be accomplished by different embodiments that are also intended to be encompassed within the spirit and scope of the invention.

In one embodiment, a conferencing system is provided through client devices such as mobile phones (e.g., smartphones), handheld computers, or laptops. The conferencing system employs voice conferencing alone or a combination of media types such as voice, video, tactile feedback, etc. The conferencing system is architected to employ a meditating server between the various conferencing client devices. In some embodiments, the conferencing system operates peer-to-peer without the mediation server. The conferencing system may be operated through circuit switched telephone networks or through IP networks (Voice over IP or VOIP).

The conferencing system is operated in conjunction with an external process such as playback or watching a television program, playback or watching a movie, playback or listening to a radio program, participation in a live concert, etc. This allows for the content communicated through the conferencing system to be dependent or relevant to the external process.

In one embodiment, the conferencing system includes a user directory that is populated explicitly by users entering address information. In other embodiments, the conferencing system includes a mechanism for automatically extracting addresses from other systems such as a mobile phone contacts database or address book; network address books available on email or social networking websites or address books integrated into Instant Messaging clients.

In one embodiment, the conferencing system uses exclusively audio content captured through microphones or video captured through cameras. In another embodiment, the conferencing system includes tools for inserting additional content other than audio captured through microphones or video captured through cameras. Such additional content may be in the form of audio clips, visual graphical animations, etc. The additional content may be shared with all participants in a conference or only with specific participants. The selection of recipients of the additional content may be input by the user or automatically selected by the conferencing system.

In one embodiment, the conferencing system features a separate conference for each external process the system it is used in conjunction with. In another embodiment, the conferencing system features multiple conferences for each external process the system it is used in conjunction with.

In one embodiment, conferences are created by the conferencing system for the external processes. In another embodiment, conferences are created by the users of the conferencing system corresponding to the external processes.

In one embodiment, conferences are scheduled to start with start of the corresponding external processes. In another embodiment, conferences are started by users and correlated to the external processes. Users may invite other users to join a conference. Users may also deny entry for other users from joining a conference. Users may also "un-invite" or remove a participant from a conference. In one embodiment, a user who starts a conference manages the participation of other users in a conference. In another embodiment, the system manages the participation of all users in a conference.

In one embodiment, one or more conferences are created per television program to allow for communication among the members of the audience of the television program. In one embodiment, aspects of the conference such as the conference audio or animated graphics may be incorporated into the audio and video content presented on the television. In another embodiment, aspects of the conference such as the conference audio or animated graphics are presented exclusively on a client device such as a mobile phone, tablet, or laptop.

In one embodiment, the conference system may employ noise cancellation modules to remove background noise from the audio and video being communicated in the conferencing system.

In one embodiment, the conference system employs a pattern matching system to match background audio received through the conferencing system from clients to background audio received through the conferencing system from other clients or to a database of audio to identify the content that is the source of the audio and hence derive identity of the external process. In some embodiments, the conferencing system may use one or more context parameters such as time of day, location of client device or user, date, client device identity, user identity, etc. to infer the identity of the external process. For instance, if the external process is a television program, the date, time of day, client device location, and background audio can be used as context parameters to identify the television program. In some embodiments, the first user to initiate a conference corresponding to an external process may input the identity of the external process manually or by selecting from an available collection of options (e.g., menu of television programs). Users who happen to be using the conferencing system subsequently will have the external process automatically identified for them using context parameters such as the date, time of day, client device location, and background audio.

In one embodiment, the conferencing system may incorporate system generated content such as advertisements into a conference. Such system generated content may be presented on the client device or incorporated into the external process. For instance, advertisement content may be presented on the client device in conjunction with the external process or further the advertisement may be incorporated into an external process like a television program using overlay techniques.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   using at least one computer processor at a conferencing server, interconnecting a plurality of client devices, wherein the client devices comprise smartphones or tablets;
   at the conference server, generating a user directory comprising extracting user address information associated with the client devices;
   delivering a first content to a first group of client devices, wherein the first content communicated via the conferencing server is relevant to a first external process, wherein the first external process comprises watching of a television program;
   delivering a second content to a second group of client devices, wherein the second content communicated via the conferencing server is relevant to a second external process, wherein the second external process comprises watching of a television program or listening to a radio program;
   receiving via tools in the conference server a first additional content relevant to the first external process;
   communicating the first additional content to one of the plurality of client devices but not to another of the plurality of client devices by automatically selecting a subset of client devices to deliver the first additional content to, without being specified by the first client;
   receiving via tools in the conference server a second additional content relevant to the second external process;
   communicating the second additional content to one of the plurality of client devices but not to another of the plurality of client devices by automatically selecting a subset of client devices to deliver the first additional content to, without being specified by the first client;
   receiving audio at the conferencing server from one of the plurality of client devices where noise cancellation is used to remove background noise in the received audio;
   comparing the received audio to a database of audio stored at the conferencing server;
   based on the comparison of the received audio and database of audio, identifying an additional external process by the conferencing server without manual selection by the one client;
   after identifying the additional external process by the conferencing server, subsequently automatically identifying for another of the plurality of client devices the additional external process;
   receiving a device location from one of the plurality of client devices;
   based on the device location and a time of day, identifying a second additional external process by the conferencing server without a manual selection by the one client; and
   after identifying a second additional external process by the conferencing server, subsequently automatically identifying for another of the plurality of client devices the second additional external process.

2. The method of claim 1 wherein the first additional content comprises video.

3. The method of claim 1 wherein the first additional content comprises audio.

4. The method of claim 1 wherein the first additional content comprises video graphical animation.

5. The method of claim 1 wherein the first additional content comprises audio clips.

6. The method of claim 1 wherein the first additional content comprises tactile information.

7. The method of claim 1 wherein the conferencing server operates over a voice over IP network.

8. The method of claim 1 wherein the conferencing server operates over a circuit switched telephone network.

9. The method of claim 1 wherein the conferencing server operates using a peer-to-peer network.

10. The method of claim 1 wherein the conferencing server operates using a mediation server.

11. The method of claim 1 comprising:
    incorporating system generated content into the first external process; and
    delivering the first external process with the system generated content to another of the plurality of client devices.

12. The method of claim 1 wherein the system generated content comprises an advertisement and the advertisement is overlaid on the first additional external process.

* * * * *